United States Patent
Rayborn, Sr. et al.

(10) Patent No.: US 8,673,825 B2
(45) Date of Patent: *Mar. 18, 2014

(54) DRILLING FLUID ADDITIVE WITH LOW FREEZING POINT

(75) Inventors: Jerry Rayborn, Sr., Franklinton, LA (US); Dan M. DeLaRosa, Coral Springs, FL (US)

(73) Assignee: Mudmasters Group, LLC, New Orleans, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/507,065

(22) Filed: Jun. 1, 2012

(65) Prior Publication Data

US 2012/0289435 A1    Nov. 15, 2012

Related U.S. Application Data (63) Continuation-in-part of application No. 13/134,048, filed on May 27, 2011, now Pat. No. 8,216,981, which is a continuation-in-part of application No. 12/802,702, filed on Jun. 14, 2010, now Pat. No. 7,972,995, which is a continuation-in-part of application No. 12/459,480, filed on Jul. 2, 2009, now Pat. No. 7,763,570, which is a continuation-in-part of application No. 12/387,182, filed on Apr. 30, 2009, now Pat. No. 7,745,378.

(51) Int. Cl.
*C09K 8/08* (2006.01)

(52) U.S. Cl.
USPC ............ 507/111; 507/110; 507/125; 127/29; 127/30; 127/32

(58) Field of Classification Search
None
See application file for complete search history.

(56) References Cited

U.S. PATENT DOCUMENTS

| | | |
|---|---|---|
| 2,771,138 A | 11/1956 | Beeson |
| 3,960,832 A | 6/1976 | Kang |
| 3,979,303 A | 9/1976 | Kang |
| 4,186,025 A | 1/1980 | Kang |
| 4,329,448 A | 5/1982 | Cox |
| 4,357,423 A | 11/1982 | Cox |
| 4,375,512 A | 3/1983 | Rickman |
| 4,393,089 A | 7/1983 | Cox |
| 4,456,714 A | 6/1984 | Cox |
| 4,464,410 A | 8/1984 | Cox |
| 4,468,334 A | 8/1984 | Cox |
| 4,483,782 A | 11/1984 | Cox |
| 4,483,848 A | 11/1984 | Cox |
| 4,506,044 A | 3/1985 | Cox |
| 5,106,517 A * | 4/1992 | Sheu et al. ............ 507/110 |
| 5,110,484 A | 5/1992 | Shou |
| 5,330,005 A | 7/1994 | Card |
| 5,439,055 A | 8/1995 | Card |
| 5,501,275 A | 3/1996 | Card |
| 5,882,713 A | 3/1999 | Eskins |
| 6,123,159 A | 9/2000 | Brookey |
| 6,129,857 A | 10/2000 | Sapienza |
| 6,172,011 B1 | 1/2001 | Card |
| 6,258,755 B1 | 7/2001 | House |
| 6,271,001 B1 | 8/2001 | Clarke |
| 6,291,404 B2 | 9/2001 | House |

(Continued)

*Primary Examiner* — John J Figueroa
(74) *Attorney, Agent, or Firm* — Dan De La Rosa (57) ABSTRACT

A drilling fluid additive, is provided, and the additive comprises: syrup solids and a liquid medium; and the sugar content of the additive is directly proportionate to the freezing point of the additive.

30 Claims, 4 Drawing Sheets

(56) References Cited

U.S. PATENT DOCUMENTS

| | | |
|---|---|---|
| 6,358,889 B2 | 3/2002 | Waggenspack |
| 6,422,326 B1 | 7/2002 | Brookey |
| 6,458,343 B1 | 10/2002 | Zeman |
| 6,506,318 B1 | 1/2003 | Sapienza |
| 6,686,330 B2 | 2/2004 | Jordan |
| 6,890,451 B2 | 5/2005 | Sapienza |
| 7,063,176 B2 | 6/2006 | Schlemmer |
| 7,207,387 B2 | 4/2007 | Eoff |
| 7,270,768 B2 | 9/2007 | Sapienza |
| 2002/0009530 A1* | 1/2002 | DuBois et al. ............... 426/567 |
| 2004/0099446 A1 | 5/2004 | Schlemmer |
| 2005/0133180 A1 | 6/2005 | West |
| 2005/0247907 A1 | 11/2005 | Sapienza |
| 2006/0205604 A1 | 9/2006 | Schlemmer |
| 2008/0268126 A1* | 10/2008 | Opawumi et al. ............. 426/567 |
| 2009/0123617 A1* | 5/2009 | Dunham ....................... 426/312 |
| 2010/0292107 A1* | 11/2010 | Rayborn et al. .............. 507/111 |
| 2011/0086783 A1* | 4/2011 | Rayborn et al. .............. 507/110 |

\* cited by examiner

DRILLING FLUID ADDITIVE WITH LOW FREEZING POINT

RELATED APPLICATION

This application is a continuation-in-part of U.S. application Ser. No. 13/134,048 filed on May 27, 2011 now U.S. Pat. No. 8,216,981 entitled "Drilling Fluid Additive System", which is continuation-in-part of U.S. application Ser. No. 12/802,702 filed on Jun. 14, 2010 now U.S. Pat. No. 7,972,995, entitled "Drilling Fluid Additives Containing Heated Syrup Solids", which is a continuation-in-part of U.S. application Ser. No. 12/459,480 filed on Jul. 2, 2009 entitled "Drilling Fluid Additives Containing Syrups" which issued on Jul. 27, 2010 as U.S. Pat. No. 7,763,570, and which is a continuation-in-part of U.S. application Ser. No. 12/387,182 filed on Apr. 30, 2009 entitled "Drilling Fluid Additives Containing Corn Syrup Solids" which issued on Jun. 29, 2010 as U.S. Pat. No. 7,745,378.

BACKGROUND OF THE INVENTION

1. Field of the Invention

The present invention relates to a drilling fluid additive and more specifically, a continuous liquid phase of drilling fluids system comprising hydrolyzed syrup and heated syrup solids.

2. Description of the Related Art

There are various drilling applications and additives in the art that combine carbohydrates with a plurality of different ingredients. These formulations have provided for moderate results.

There are also various ingredients combined to provide for a continuous liquid phase of a drilling fluid. In the past, water, diesel oil, synthetic oils and combinations of oils and emulsions have been used as the continuous liquid phase of drilling fluids with inefficient to moderate results.

A drilling fluid with water as the continuous liquid phase has many economical advantages. Water is plentiful, non-polluting and environmentally friendly when properly maintained. It is very important that the additives mixed with the water are also non-polluting and environmentally friendly. Fluid loss additives, lubricants, dispersants, shale and formation inhibitors should also be non-polluting and environmentally friendly. A fluid that has higher concentrations of these additives typically has higher toxicity and subsequently has a lower LC50 number.

Using diesel oil as a continuous liquid phase of a drilling fluid is economical, but environmentally hazardous. Drill cuttings must be contained and remediated, as well as earthen pits are contaminated with the diesel oil and salt water used, adding to the costs and inefficiency of diesel based fluids.

Using a synthetic hydrocarbon or specific olefin for the continuous liquid phase of the drilling fluid has its advantages, however, these synthetic oils are expensive and in short supply.

The present invention provides for an economically efficient and environmentally safe drilling fluid additive and can also function as the continuous liquid phase of the drilling fluid. The present invention also provides for a drilling fluid additive that provides the advantages of lubrication and wellbore stability.

SUMMARY OF THE INVENTION

In one embodiment, the present invention provides for a drilling fluid additive consisting essentially of: corn syrup solids or syrup solids in the amount from about 30 to about 80% by volume of total volume of the additive and a liquid medium in the amount from about 20 to about 70% by volume of total volume of the additive.

In another embodiment, the liquid medium is selected from a group consisting of water, purified water, ionized water, salt water and mixtures thereof. In yet another embodiment, the additive improves the lubrication and reduces the coefficient of friction on the water phase of the drilling fluid.

In still another embodiment, the liquid medium is an aqueous liquor. For purposes of this invention, the term "aqueous liquor" is defined as any liquid medium or juice.

In still yet another embodiment, the corn syrup solids or syrup solids are in the amount from about 70 to about 80% by volume of the total volume of the additive. In a further embodiment, the liquid medium is in the amount from about 20 to about 30% by volume of the total volume of the additive. In yet a further embodiment, the density of the additive is from about 8 to about 12 pounds per gallon and more specifically 9 to about 11.8 pounds per gallon. In still a further embodiment, the additive suppresses and restricts hydration of clays and shales when deposed into a wellbore.

In another further embodiment, the additive is dextrose syrup. In still yet a further embodiment, the syrup solids can be derived from all different types of sugars and carbohydrates. Sugars include sucrose, dextrose and fructose. The carbohydrates utilized in the present invention may be derived from sugar cane, sugar beet, fruit, honey sorghum and sugar maple (Maple syrup).

In another embodiment, the corn syrup solids or syrup solids are hydrolyzed prior to being combined with a liquid medium. In still another embodiment, the additive is combined with copolymer beads. In yet another embodiment, the copolymer beads are comprised of styrene and divinylbenzene (DVB).

In still yet another embodiment, the present invention relates to a continuous liquid phase solution for a drilling fluid, said solution consists essentially of: corn syrup or syrup, corn syrup solids or syrup solids and a liquid medium.

In a further embodiment, the corn syrup or syrup is from about 10 to about 90% by volume of total volume of the solution, the corn syrup solids or syrup solids is from about 10 to about 80% by volume of total volume of the solution, and the liquid medium is from about 20 to about 90% by volume of total volume of the solution.

In still a further embodiment, the present invention relates to a drilling fluid additive consisting of hydrolyzed glucose syrup solids or syrup solids in the amount from about 30 to about 90% by volume of total volume of the additive and a liquid medium in the amount from about 10 to about 70% by volume of total volume of the additive.

In another embodiment, the present invention also relates to a continuous liquid phase of the drilling fluid which consists essentially of concentrated carbohydrates, namely corn syrup or cane syrup, or a combination of the two with a liquid medium such as water. The testing established that the higher the concentration of carbohydrates, the more the continuous fluid resembles an oil based continuous phase fluid. It was also discovered that the degree of lubrication, well bore stabilization and fluid loss control are directly proportional to the percentage of the concentrated carbohydrates. Testing show that this present invention is non-toxic, biodegradable and environmentally friendly with an LC 50 rating of greater than 1,000,000 at a concentration of 50%.

In another embodiment, the syrup and corn syrup solids are derived from a group consisting essentially of agave syrup, barley syrup, sugar syrup, beets syrup, birch syrup, rice syrup, cane syrup, chocolate syrup, coconut syrup, corn syrup, date syrup, fruit syrup, golden syrup, high fructose corn syrup, inverted sugar syrup, karo syrup, citrus fruit syrup, maple syrup, molasses, Muscavado syrup, palm syrup, rice syrup, sorghum syrup, Turbinado syrup, vanilla syrup and mixtures and blends thereof.

In a further embodiment, the present invention provides for a continuous liquid phase solution for a drilling fluid, and the solution consists essentially of: syrup, syrup solids and a liquid medium, and the syrup and syrup solids are derived from a group consisting essentially of agave syrup, barley syrup, sugar syrup, beets syrup, birch syrup, rice syrup, cane syrup, chocolate syrup, coconut syrup, corn syrup, date syrup, fruit syrup, golden syrup, high fructose corn syrup, inverted sugar syrup, karo syrup, citrus fruit syrup, maple syrup, molasses, Muscavado syrup, palm syrup, rice syrup, sorghum syrup, Turbinado syrup, vanilla syrup and mixtures and blends thereof.

In another further embodiment, the present invention relates to a drilling fluid additive consisting essentially of hydrolyzed syrup solids in the amount from about 30 to about 90% by weight of total volume of said additive and a liquid medium in the amount from about 10 to about 70% by weight of total volume of said additive, and the syrup solids are derived from a group consisting essentially of agave syrup, barley syrup, sugar syrup, beets syrup, birch syrup, rice syrup, cane syrup, chocolate syrup, coconut syrup, corn syrup, date syrup, fruit syrup, golden syrup, high fructose corn syrup, inverted sugar syrup, karo syrup, citrus fruit syrup, maple syrup, molasses, Muscavado syrup, palm syrup, rice syrup, sorghum syrup, Turbinado syrup, vanilla syrup and mixtures and blends thereof In another embodiment, the syrup solids are treated with heat or heated to remove or evaporate water leaving the sugars or carbohydrates. In yet another embodiment, the treatment is done using cooking or boiling methods. In still another embodiment, the heating of the syrup solids is done prior to being admixed with the liquid medium.

In a further embodiment, the present invention provides for a drilling fluid additive system comprising of: a first additive comprising of heated syrup solids in the amount from about 30 to about 80% by volume of total volume of the first additive and a first liquid medium in the amount from about 20 to about 70% by volume of total volume of the first additive; and a second additive comprising of hydrolyzed syrup solids in the amount from about 30 to about 80% by volume of total volume of the second additive and a second liquid medium in the amount from about 20 to about 70% by volume of total volume of the second additive.

In another embodiment, the present invention provides for a continuous liquid phase solution for a drilling fluid comprising: syrup, heated syrup solids and a liquid medium, and the syrup and heated syrup solids are derived from a group consisting essentially of agave syrup, barley syrup, sugar syrup, beets syrup, birch syrup, rice syrup, cane syrup, chocolate syrup, coconut syrup, corn syrup, date syrup, fruit syrup, golden syrup, high fructose corn syrup, inverted sugar syrup, karo syrup, citrus fruit syrup, maple syrup, molasses, Muscavado syrup, palm syrup, rice syrup, sorghum syrup, Turbinado syrup, vanilla syrup and mixtures and blends thereof.

In another further embodiment, the present invention relates to a continuous liquid phase solution for a drilling fluid comprising: syrup, hydrolyzed syrup solids and a liquid medium, and the syrup and hydrolyzed syrup solids are derived from a group consisting essentially of agave syrup, barley syrup, sugar syrup, beets syrup, birch syrup, rice syrup, cane syrup, chocolate syrup, coconut syrup, corn syrup, date syrup, fruit syrup, golden syrup, high fructose corn syrup, inverted sugar syrup, karo syrup, citrus fruit syrup, maple syrup, molasses, Muscavado syrup, palm syrup, rice syrup, sorghum syrup, Turbinado syrup, vanilla syrup and mixtures and blends thereof.

In another embodiment, the present invention relates to a drilling fluid syrup additive consisting essentially of: syrup solids in the amount from about 30 to about 80% by volume of total volume of the additive and a liquid medium in the amount from about 20 to about 70% by volume of total volume of the additive, and the syrup additive has a sugar content and the sugar content is increased to decrease the freezing point of the syrup additive below the freezing point of water.

In yet another embodiment, the sugar content is a 50% sucrose solution. In still another embodiment, the freezing point of said syrup additive is −7.6 Degrees Celsius (18.32 Degrees F.).

In a further embodiment, the present invention provides for drilling fluid syrup additive manufactured by a method comprising: admixing syrup solids and a liquid medium to form a syrup additive; and increasing a sugar content of the syrup additive to thereby decrease the freezing point of the syrup additive.

In still yet another embodiment, the sugar content of said syrup additive is increased to thereby decrease the freezing point of the syrup additive below a freezing point of water.

In another further embodiment, the method further comprises the step of increasing said sugar content of the syrup additive to a 50% sucrose solution to thereby decrease the freezing point of the syrup additive to −7.6 Degrees Celsius (18.32 Degrees F.).

In yet another further embodiment, the present invention relates to a drilling fluid additive system comprising of: a first syrup additive comprising of heated syrup solids in the amount from about 30 to about 80% by volume of total volume of the first syrup additive and a first liquid medium in the amount from about 20 to about 70% by volume of total volume of the first syrup additive; and a second syrup additive comprising of hydrolyzed syrup solids in the amount from about 30 to about 80% by volume of total volume of the second syrup additive and a second liquid medium in the amount from about 20 to about 70% by volume of total volume of the second syrup additive, whereby a sugar content of the first and second syrup additives is increased to thereby decrease the freezing point of the first and second syrup additives below the freezing point of water.

In still another further embodiment, the present invention provides for a drilling fluid syrup additive mixture consisting essentially of: syrup solids in the amount from about 30 to about 80% by volume of total volume of said mixture and a liquid medium in the amount from about 20 to about 70% by volume of total volume of said mixture, the mixture has a dissolved solid content and a freezing point, and wherein a decrease in the freezing point of the mixture is directly proportional to the dissolved solids content.

In still yet another further embodiment, the dissolved solids content of the mixture is adjusted so that the freezing point of said mixture is below the freezing point of water.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In one embodiment, the additive of the present invention is manufactured as follows: pure corn starch that is approximately 99 percent pure is converted into ordinary corn syrup through a process called acid hydrolysis. In this process, the liquid corn starch is mixed with a weak solution of hydrochloric acid and heated in order to break down the corn starch molecules into sugar. The hydrolysis can be controlled in order to produce varying concentrations of corn syrup. The longer the hydrolysis process is allowed to proceed, the more concentrated the corn syrup becomes. The liquid corn syrup is then filtered and further refined and evaporated to reduce the amount of water, thus producing corn syrup solids. Some important properties of corn syrup are the dextrose and fructose content. Product information and product samples for testing were obtained from the Grain Processing Corporation (GPC). The initial testing of GPC products with a trademark name Maltrin® was to improve the solid suspension properties of various liquids in drilling fluid additives such as glycols, oils, and water. The particular solid to be suspended would be styrene and divinylbenzene (DVB) copolymer beads with a specific gravity of approximately 1.05 to 1.2 kg/m$^3$. The density of the liquid corn syrup is directly proportional to the dissolved solids content of the corn syrup. Clear corn syrup with densities of 11.5 to 11.8 pounds per gallon may be blended.

Figure 1:
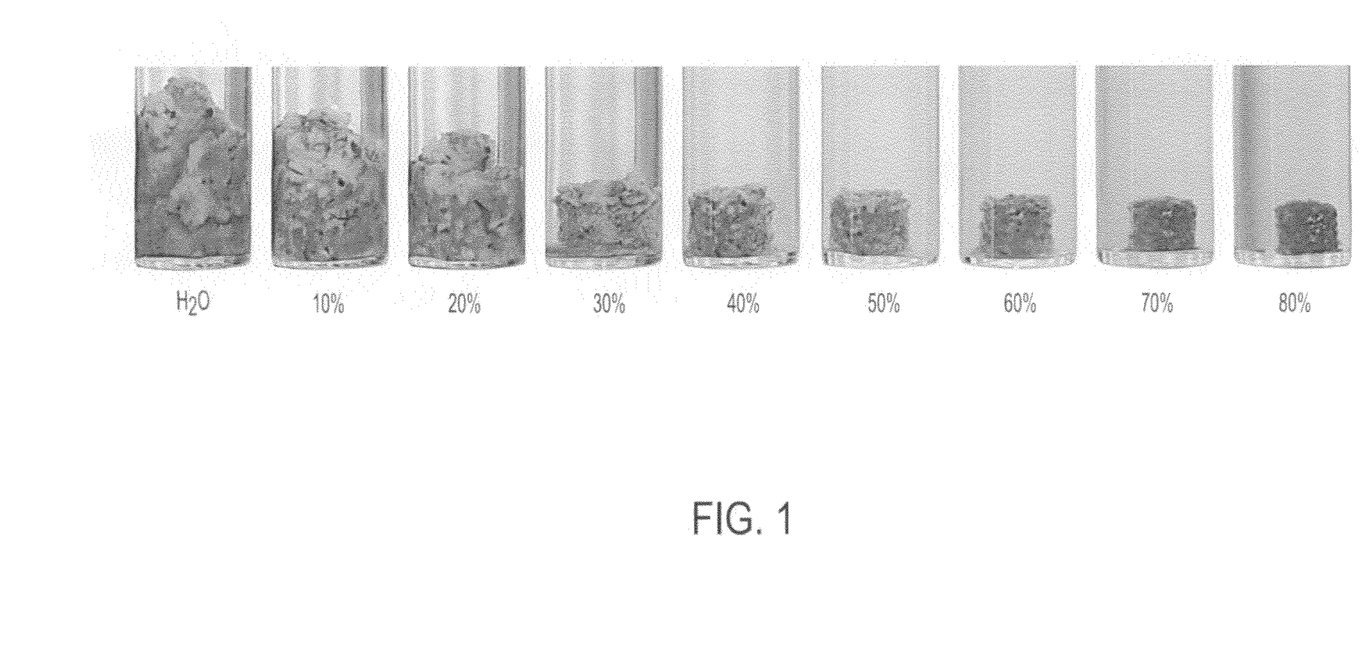
FIG. 1 is a depiction of the additives of the present invention in varying concentrations and how such concentrations of syrup solids effectuate the reaction with clays.

Preventing Hydration and Swelling of Clays in Well Bore:

Referring now to FIG. 1, the drilling additive of the present invention prevents the hydration and absorption of water by the hydrophilic clays and shales in the drilled formation. Hydrophilic water sensitive clays and shales contain substantial amounts of colloidal bentonite. Surface hydration and osmotic hydration cause the diameter of the well bore to shrink smaller than what was originally drilled. Preventing this hydration and swelling is essential in order to prevent well bore swabbing when the drilling assembly is extracted from the well bore. There have been various water-based drilling fluids that have been used to prevent hydration and swelling but such fluids have been used with moderate success. These fluids included calcium in lime based fluids, gypsum based fluids, potassium based fluids, and salt based fluids such as calcium chloride and sodium chloride fluids.

In one embodiment, the present invention uses a solution of higher concentrations of dissolved corn syrup solids to restrict or suppress the hydration of hydrophilic, water-sensitive clays and shales. In addition, the adhesion or stickiness of the Gumbo-type shales have also been reduced. In FIG. 1, the hydration and swelling of clay are tested by inserting a compressed clay pellet (Bentonite) in each of nine containers. The containers (from left to right in FIG. 1) are then filled with the following solutions as set forth in Table 1 below:

TABLE 1

Testing of Hydration and Swelling of Clays Based on Increased Concentrations of Corn Syrup Solids

| Container (#) | Water % | Corn Syrup Concentrate (%) | Results |
| --- | --- | --- | --- |
| #1 | 100% | 0% | Poor |
| #2 | 90% | 10% | Poor |
| #3 | 80% | 20% | Fair |
| #4 | 70% | 30% | Good |
| #5 | 60% | 40% | Good |
| #6 | 50% | 50% | Good |
| #7 | 40% | 60% | Excellent |
| #8 | 30% | 70% | Excellent |
| #9 | 20% | 80% | Excellent |
| #10 | 10% | 90% | Excellent (not shown) |

FIG. 1 and Table 1 clearly show how increased amounts of the concentration of the corn syrup solids provide for increased results in the suppression and restriction of the hydration of the clay. This invention shows that the osmolality of the liquid corn syrup carbohydrate is created by the dissolved corn syrup solids in the continuous liquid phase of the drilling fluid. The degree of osmolality is directly proportional to the percentage of dissolved corn syrup solids in the liquid corn syrup. This osmotic dehydration was accomplished without any salts.

Figure 2:
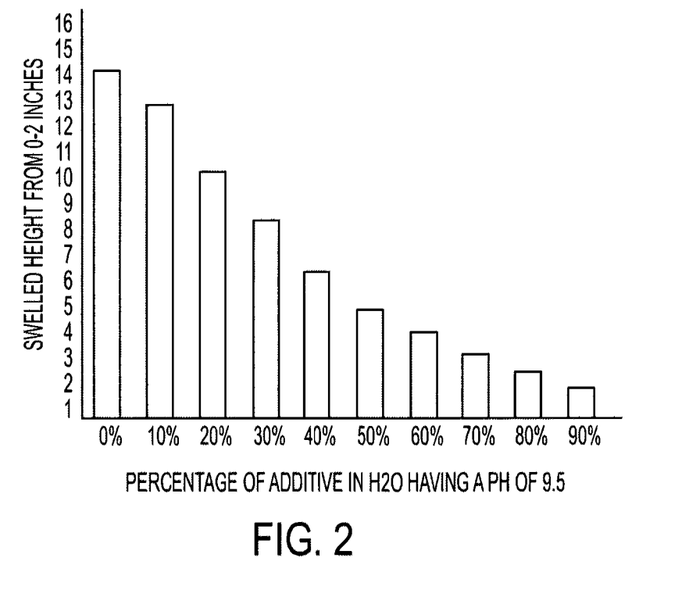
FIG. 2 is a graph showing compressed clay pellets that were submerged for 72 hours in varying concentrations of the corn syrup solids in the additive.

FIG. 2 shows a graph showing compressed clay pellets submerged for 72 hours in concentrations from about 0 to about 90% of additive mixed with water having a pH of 9.5. The graph shows how increased amounts in the concentration of the additive lessened the amount of swelling in the compressed clays further providing evidence that the present invention prevents the hydration and absorption of water by the hydrophilic clays and shales in the drilled formation.

It appears that the dissolved corn syrup solids in the liquid corn syrup carbohydrate have a greater demand for the water present in the drilling fluid than the hydrophilic shale, thus lessening the swelling of the wet well bore. It seems that the wall cake which is formed as soon as the shale is penetrated acts as the semi-permeable membrane in order for any osmosis to occur.

Keeping the Well Bore "In Gauge":

In drilling subterranean oil and gas wells, keeping the well bore "in gauge" is critical. This term means keeping the well bore the same size as the drilling bit that drilled the well bore. The reduction in well bore size is usually directly proportional to the amount of time that the well bore is exposed to the drilling fluid. In many cases, the well bore may be exposed to the fluid for many days or weeks before the well bore casing is installed. The drilling fluid deposits a wall cake on the surface of the well bore. The thickness of the wall cake is directly proportional to the fluid loss or the amount of liquid that is forced from the drilling fluid into the well bore. Therefore, the less liquid leaving the drilling fluid, the thinner the cake wall (filter cake) will be. Having a low filtrate loss and a thin filter cake is desired and produces an "in gauge" well bore.

Another reason for the well bore size to lose its "in gauge" would be the hydration and swelling of the hydrophilic clays and shale in the wall of the well bore. The swelling of this shale may be caused by osmotic absorption of the drilling fluid or "hydration".

Controlling the thickness and the quality of the filter cake which is deposited on the wellbore is absolutely essential to keeping the wellbore "in gauge". The thickness of the filter cake is directly proporational to the volume of liquid passing through the filter cake.

To represent "in gauge" testing of the drilling fluid additive of the present invention, the following tests were conducted to observe (a) fluid loss in ml; (b) filter cake weight in grams; and (c) filter cake thickness in inches:

(1) High Pressure High Temp Filtration Test:

A mud sample is heated to 250 degrees F. and 500 psi of pressure is applied to force liquid through the a filter paper. The volume of liquid and filter cake thickness are recorded.

The results of the High Pressure High Temp Filtration Test is set forth in Table 2 below:

TABLE 2

High Pressure High Temp Filtration Test

| | Base Mud | Base Mud + 30% Additive | Base Mud + 40% Additive |
|---|---|---|---|
| Density: | 11.0 | | |
| pH Meter | 8.3 | | |
| 600 rpm | 32 | 92 | 62 |
| 300 rpm | 19 | 56 | 35 |
| 200 rpm | 15 | 42 | 25 |
| 100 rpm | 10 | 25 | 15 |
| 6 rpm | 4 | 5 | 4 |
| 3 rpm | 3 | 4 | 3 |
| PV@120 F. | 13 | 36 | 27 |
| YP | 6 | 20 | 8 |
| Gels 10 s/10 m/30 m | 10/34 | 7/22/29 | 3/10/19 |
| HPHT@ 250 degree F./ml | 36.0 | 3.2 | 2.4 |
| Cake Wt/g | 24 | 5.4 | 4.7 |
| Cake Thickness/inch | 6/32 | 1/32 | 1/32 |

(2) Dynamic Filtration Test:

This test utilizes a sand disc with a 5 Darcy, 20 micron filter media. This test consists of more pressure, 1000 psi, with a more porous filter media. The fluid is sheared or stirred during the test.

The results of the Dynamic Filtration Test is set forth in Table 3 below:

TABLE 3

Dynamic Filtration Test
5 Darcy, 20 Micron Filter Media
200 Degree F., 600 RPM @ 1000 PSI for 60 Minutes

| | Base Mud | Base Mud + 30% Additive | Base Mud + 40% Additive |
|---|---|---|---|
| Time (Minutes) | | Fluid Loss (ml) | |
| Initial Spurt | 8.0 | 0.0 | 0.0 |
| 15 Minutes | 31.2 | 2.0 | 1.2 |
| 30 Minutes | 46.0 | 3.4 | 2.2 |
| 45 Minutes | 56.4 | 4.7 | 3.0 |
| 60 Minutes | 66.0 | 6.5 | 5.4 |
| Cake wt (g) | 44 | 8 | 8 |
| Cake thickness (inch) | 11/32 | 2/32 | 1/32 |

Results of High Pressure High Temp Filtration Test & Dynamic filtration Test:

Substantial reductions in fluid loss, filter cake weight and filter cake thickness are obvious from these results. The additive of this invention contributes to the improvement of the wall cake quality thereby helping to provide an "in gauge" well bore.

Lubricity Testing:

Improving the lubricating qualities of the drilling fluid is an area where the additive of the present invention excelled. A lubricity meter was used to measure the lubricating qualities of water having a pH of 9.5 and comparing the results with various concentrations ranging from 10% to 90% by volume of additive with water. Torque readings were taken from 100 to 600 inch pounds of torque.

The results of the lubricity testing are set forth in Table 4 below and shown in FIG. 3:

TABLE 4

Lubricity Test

| Sample: | Results: |
|---|---|
| (1) water | seized at a torque of 290 inch pounds |
| (2) 10% additive and 90% water | seized at 360 inch pounds |
| (3) 20% additive and 80% water | seized at 440 inch pounds |
| (4) 30% additive and 70% water | did not seize at 600 inch pounds |
| (5) 40% additive and 60% water | torque reading at 55 |
| (6) 50% additive and 50% water | torque reading at 50 |
| (7) 60% additive and 40% water | torque reading at 42 |
| (8) 70% additive and 30% water | torque reading at 35 |
| (9) 80% additive and 20% water | torque reading at 27 |

Figure 3:
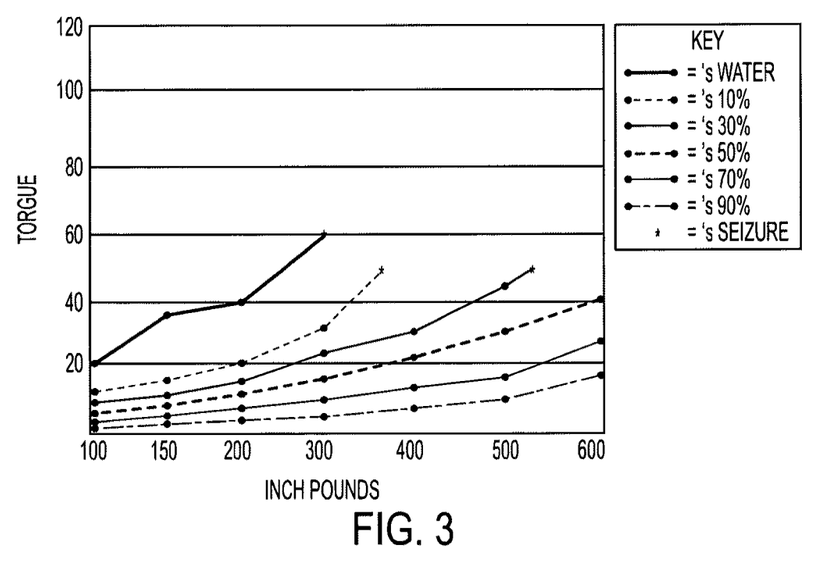
FIG. 3 is a graph showing the lubricity of the present invention.

From FIG. 3 and Table 4, it can be seen that a concentration of 30% or more of the additive did not seize and the resulting torque reading continually decreased as the concentration of the additive was increased.

Figure 4:
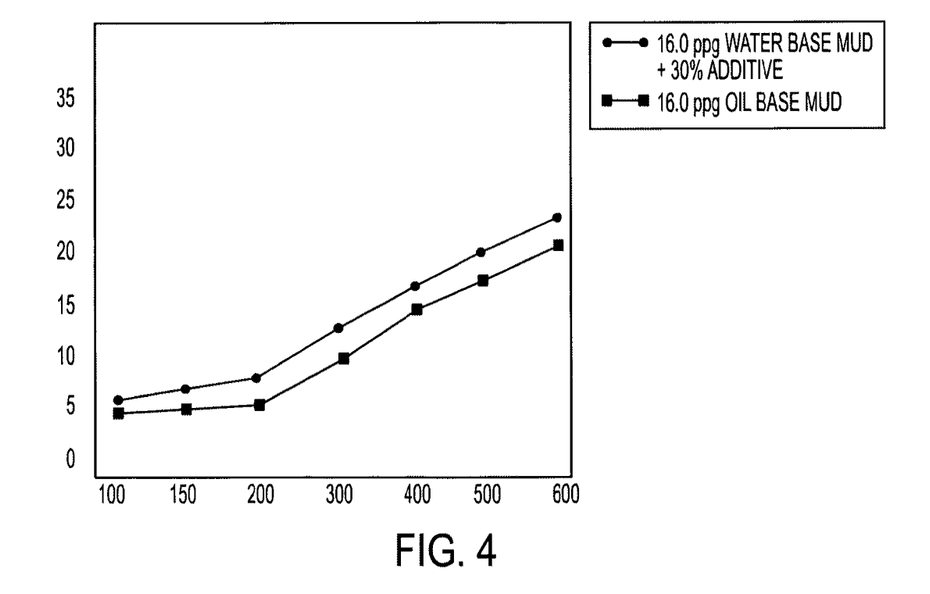
FIG. 4 is a graph showing a comparison of a water based drilling fluid weighing 16.0 ppg containing 30% of additive with a 16.0 ppg oil based drilling fluid.

FIG. 4 illustrates the comparison of a water based drilling fluid weighing 16.0 ppg containing 30% of additive with a 16.0 ppg oil based drilling fluid. As evidenced by FIG. 4, the lubricating qualities of the water based drilling fluid containing 30% by volume of additive was almost identical to the oil mud. The water based drilling fluid used for this test is extremely environmentally friendly having an LC50 rating of greater then 1,000,000.

Controlling the Density of the Drilling Fluid:

Controlling the density of the drilling fluid is essential to the success of drilling oil or gas wells. The density of water having a specific gravity of 1.0 and weighing 8.34 pounds per gallon may be increased by dissolving a salt such as sodium chloride and increasing the density of water to about 10.5 pounds per gallon at the saturation point of sodium chloride. By saturating calcium chloride, a density of about 11.6 pounds per gallon may be achieved. Other salts such as zinc bromide may be used to produce higher densities. The negative side of salt water fluids is the corrosion and lack of compatibility with other additives and also exhibit poor lubrication qualities.

A concentrated carbohydrate corn syrup consisting of fresh water and from about 60 to about 75 percent by weight of dissolved corn syrup solids will have a density of approximately 11.5 to 11.8 pounds per gallon. In a further embodiment, the present invention uses concentrated corn syrup to increase the density of the liquid phase of the drilling fluid as set forth in Table 5 below:

TABLE 5

Increased Concentrations of Corn Syrup Solids Relate to Density of Liquid Phase of Drilling Fluid

| Volume of Additive (%) | Water (%) | Density (lbs per Gallon) |
|---|---|---|
| 90% | 10% | 11.2 |
| 80% | 20% | 10.9 |
| 70% | 30% | 10.6 |
| 60% | 40% | 10.3 |
| 50% | 50% | 10.0 |
| 40% | 60% | 9.7 |
| 30% | 70% | 9.4 |
| 20% | 80% | 9.1 |
| 10% | 90% | 8.8 |

The densities of a drilling fluid may be increased by these values without the addition of particulate solids such as barite. Thus, any settlings or stratifying of barite solids for a liquid drilling fluid up to 11.8 pounds per gallon are eliminated.

Alternative Syrups and Syrup Solids:

In addition to corn syrup and corn syrup solids, the present invention relates to the use of various other syrups and syrup solids. These syrups and syrup solids are derived from a group consisting essentially of agave syrup, barley syrup, sugar syrup, beets syrup, birch syrup, rice syrup, cane syrup, chocolate syrup, coconut syrup, corn syrup, date syrup, fruit syrup, golden syrup, high fructose corn syrup, inverted sugar syrup, karo syrup, citrus fruit syrup, maple syrup, molasses, Muscavado syrup, palm syrup, rice syrup, sorghum syrup, Turbinado syrup and vanilla syrup.

In general, syrups are defined as a thick, viscous, sticky liquid that contains a large amount of dissolved sugars which do not have a tendency to crystallize. The word "syrup" comes from the Arabic word "sharab", meaning beverage.

Agave syrup comes from the sap of the maguey cactus found in Mexico. It is about 25% sweeter than sugar and its composition is 90% fructose and 10% sucrose.

Barley syrup or barley malt syrup is made from soaked and sprouted barley, which is then dried and cooked down to a syrup.

Sugar syrup or bar syrup or simple syrup is a mixture of equal parts of sugar and hot water, made by gradually stirring one pound of granulated sugar into 13 ounces of water over a medium heat until the sugar dissolves and the mixtures becomes a syrup.

Beets syrup is derived from sugar beets. Birch syrup is made from the sap of birch trees. Rice syrup or brown rice syrup or rice bran syrup and rice malt is a low-glycemic sugar which is half as sweet as table sugar.

Cane syrup is derived from the sugar cane which is 99.95% sucrose and 0.05% of trace minerals and proteins. Chocolate syrup is generally made from unsweetened cocoa powder and corn syrup. Coconut syrup is made from a brownish sugar derived from the sap of coconut palm. Corn syrup is derived from corn starch and is a sweet syrup known as glucose syrup outside of the U.S. and Canada.

Date syrup is derived from ground, dehydrated dates. This syrup is high in fiber and good source of vitamins and minerals.

Fruit syrup or fructose syrup is derived from honey and fruits and is sweeter than sucrose syrups. Golden syrup is an amber colored syrup made from evaporated sugar cane juice and is generally a by-product of the process of obtaining refined crystallized sugar.

High fructose corn syrup (HFCS) is a sweeter form of corn syrup made from corn starch. Inverted sugar syrup is a sucrose-based syrup that is treated with the enzyme invertase and/or an acid. Karo syrup is derived from dark corn syrup or from the karo plant.

Citrus fruit syrup includes lemon syrup, lime syrup, orange syrup and other citrus fruits, and is made by mixing citrus zest or peel or juice with sugar.

Maple syrup is a largely refined sweetener made from the sap of maple trees and is the boiled sap of the sugar maple tree. It is about 60% sucrose and 60% sweeter than sugar. Molasses or treacle is a thick syrup produced as the by-product during the refining of sugar cane or sugar beets. Muscovado syrup or dark muscovado syrup or moist sugar syrup or Barbados sugar syrup is a specialty raw sugar, moist with high molasses content, very dark brown in color and stickier than most brown sugars.

Palm syrup is derived from the nectar of the sugar palm tree. Rice syrup is made from soaked and sprouted rice (or rice and barley) which is dried and cooked down to a thick syrup. Rice syrup contains a high level of maltose.

Sorghum syrup or sorghum molasses is derived from sorghum which is a grain similar to corn. Turbinado sugar syrup is a specialty brown sugar cane extract whose name derives because it is created when spun in a cylinder or turbine while being sprayed. Vanilla sugar syrup is derived from a combination of granulated sugar with extracts from the vanilla bean.

The present invention may utilize one or more of these syrups, alone or in combination with one another.

Freezing Point of Additive or Mixture:

In one embodiment, the additive or mixture of the present invention syrup additive has a sugar content and the sugar content is directly proportional to the freezing point. For example, when the sugar content is increased the freezing point of said syrup additive or mixture is decreased. The present invention relates to an additive or mixture that allows for the increase of the sugar content so that the freezing point of the additive or mixture is at or below the freezing point of water.

In another embodiment, the freezing point of an additive or mixture is directly proportional to the dissolved solids content of the additive or mixture. By increasing the dissolving solids content of the additive or mixture, the freezing point of the additive or mixture is decreased. The Brix Meter may be used to measure the percentage of dissolved solids in the additive or mixture.

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. A method of manufacturing a drilling fluid syrup additive, said method comprising: admixing syrup solids in the amount from about 30 to about 80% by volume of total volume of said additive and a liquid medium in the amount from about 20 to about 70% by volume of total volume of said additive, and increasing a sugar content of said syrup additive to decrease the freezing point of said syrup additive below the freezing point of water.

2. The method of claim 1 wherein said liquid medium is selected from a group consisting of water, purified water, ionized water, salt water and mixtures thereof.

3. The method of claim 1 wherein said syrup solids are derived from a group consisting essentially of agave syrup, barley syrup, sugar syrup, beets syrup, birch syrup, rice syrup, cane syrup, chocolate syrup, coconut syrup, corn syrup, date syrup, fruit syrup, golden syrup, high fructose corn syrup, inverted sugar syrup, karo syrup, citrus fruit syrup, maple syrup, molasses, Muscavado syrup, palm syrup, rice syrup, sorghum syrup, Turbinado syrup, vanilla syrup and mixtures and blends thereof.

4. The method of claim 1 wherein said sugar content is a 50% sucrose solution.

5. The method of claim 4 wherein said freezing point of said syrup additive is −7.6 Degrees Celsius (18.32 Degrees F.).

6. The method of claim 1 wherein said syrup solids are hydrolyzed.

7. The method of claim 1 wherein said syrup solids are heated.

8. The method of claim 6 wherein said syrup solids are hydrolyzed prior to being combined with said liquid medium.

9. The additive method of claim 7 wherein said syrup solids are cooked prior to being combined with said liquid medium.

10. The method of claim 7 wherein said syrup solids are boiled prior to being combined with said liquid medium.

11. The method of claim 1 wherein said additive is combined with copolymer beads.

12. A method of making a drilling fluid syrup additive, said a method comprising: admixing syrup solids and a liquid medium to form a syrup additive; and increasing a sugar content of said syrup additive to thereby decrease the freezing point of said syrup additive.

13. The method of claim 12 wherein said sugar content of said syrup additive is increased to thereby decrease the freezing point of said syrup additive below a freezing point of water.

14. The method of claim 12 further comprising the step of hydrolyzing said syrup solids prior to admixing with said liquid medium.

15. The method of claim 12 further comprising the step of heating said syrup solids prior to admixing with said liquid medium.

16. The method of claim 12 wherein said syrup solids are derived from a group consisting essentially of agave syrup, barley syrup, sugar syrup, beets syrup, birch syrup, rice syrup, cane syrup, chocolate syrup, coconut syrup, corn syrup, date syrup, fruit syrup, golden syrup, high fructose corn syrup, inverted sugar syrup, karo syrup, citrus fruit syrup, maple syrup, molasses, Muscavado syrup, palm syrup, rice syrup, sorghum syrup, Turbinado syrup, vanilla syrup and mixtures and blends thereof.

17. The method of claim 12 wherein said liquid medium is selected from a group consisting of water, purified water, ionized water, salt water and mixtures thereof.

18. The method of claim 12 further comprising the step of increasing said sugar content of said syrup additive to a 50% sucrose solution to thereby decrease the freezing point of said syrup additive to −7.6 Degrees Celsius (18.32 Degrees F.).

19. The method of claim 12 further comprising the step of combining said syrup additive with polymer beads.

20. A method for manufacturing a drilling fluid additive system, said method comprising of:

admixing heated syrup solids with a first liquid medium to form a first syrup additive, said heated syrup solids is in the amount from about 30 to about 80% by volume of total volume of said first syrup additive and said first liquid medium is in the amount from about 20 to about 70% by volume of total volume of said first syrup additive; and admixing hydrolyzed syrup solids and a second liquid medium to form a second syrup additive, said hydrolyzed syrup solids is in the amount from about 30 to about 80% by volume of total volume of said second syrup additive and said second liquid medium is in the amount from about 20 to about 70% by volume of total volume of said second syrup additive; and increasing a sugar content of said first and second syrup additives to thereby decrease the freezing point of said first and second syrup additives below the freezing point of water.

21. A method of making a drilling fluid syrup additive mixture, said method comprising: admixing syrup solids with a liquid medium, said syrup solids is in the amount from about 30 to about 80% by volume of total volume of said mixture and said liquid medium is in the amount from about 20 to about 70% by volume of total volume of said mixture, said mixture having a dissolved solid content and a freezing point, and wherein a decrease in said freezing point of said mixture is directly proportional to said dissolved solids content.

22. The method of claim 21 wherein said liquid medium is selected from a group consisting of water, purified water, ionized water, salt water and mixtures thereof.

23. The method of claim 21 wherein said syrup solids are derived from a group consisting essentially of agave syrup, barley syrup, sugar syrup, beets syrup, birch syrup, rice syrup, cane syrup, chocolate syrup, coconut syrup, corn syrup, date syrup, fruit syrup, golden syrup, high fructose corn syrup, inverted sugar syrup, karo syrup, citrus fruit syrup, maple syrup, molasses, Muscavado syrup, palm syrup, rice syrup, sorghum syrup, Turbinado syrup, vanilla syrup and mixtures and blends thereof.

24. The method of claim 21 wherein said syrup solids are hydrolyzed.

25. The method of claim 21 wherein said syrup solids are heated.

26. The method of claim 24 wherein said syrup solids are hydrolyzed prior to being combined with said liquid medium.

27. The method of claim 25 wherein said syrup solids are cooked prior to being combined with said liquid medium.

28. The method of claim 25 wherein said syrup solids are boiled prior to being combined with said liquid medium.

29. The method of claim 21 wherein said additive is combined with copolymer beads.

30. The method of claim 21 wherein said dissolved solids content of said mixture is adjusted so that said freezing point of said mixture is below the freezing point of water.

\* \* \* \* \*